Sept. 23, 1969      E. D. DUNN, JR      3,468,478
PRECISION SLIDE RULE COMPUTING MECHANISM
Filed Jan. 12, 1968      3 Sheets-Sheet 1
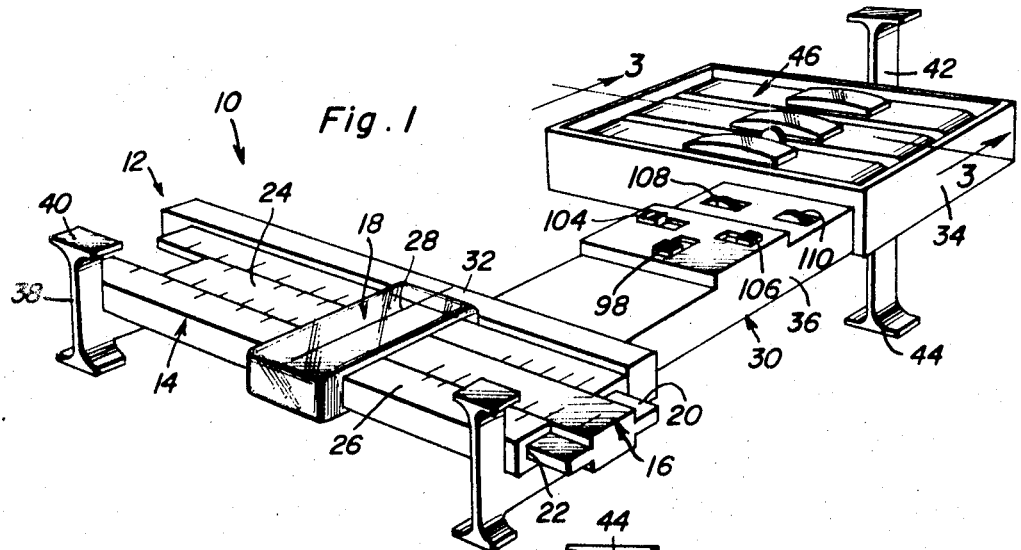
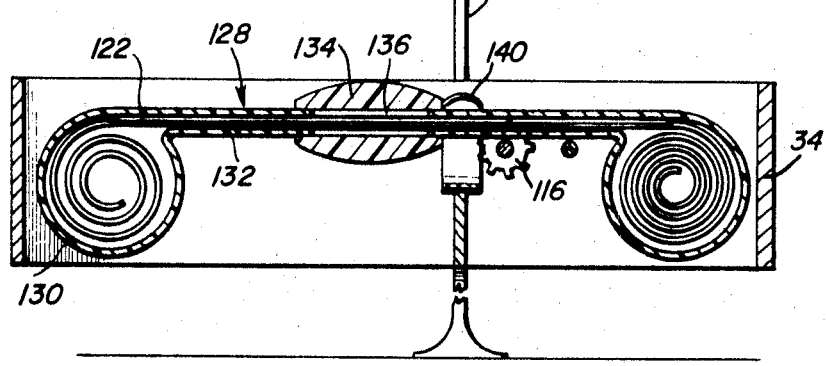
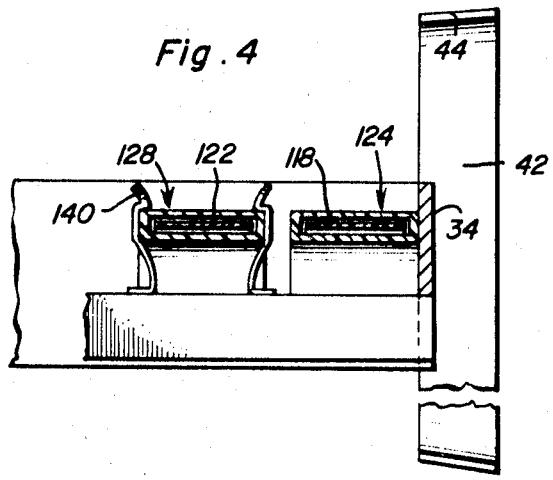
Edward D. Dunn, Jr.
*INVENTOR.*

Sept. 23, 1969   E. D. DUNN, JR   3,468,478
PRECISION SLIDE RULE COMPUTING MECHANISM
Filed Jan. 12, 1968   3 Sheets-Sheet 2
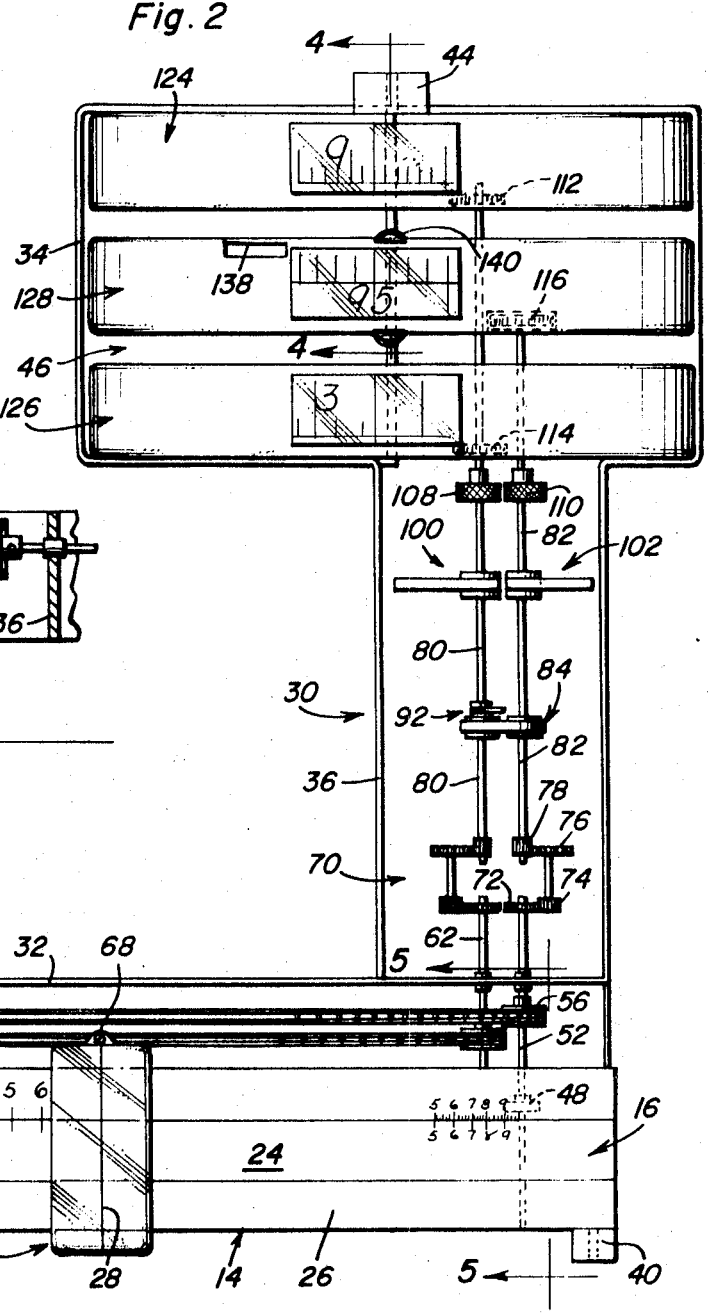
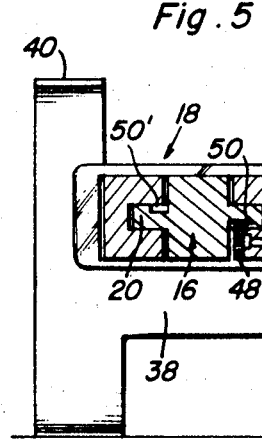
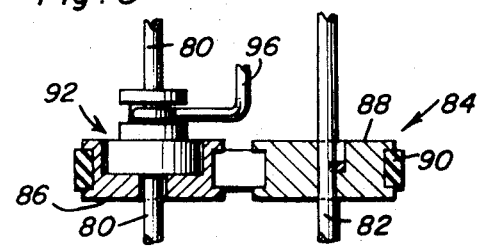
Edward D. Dunn, Jr.
INVENTOR.

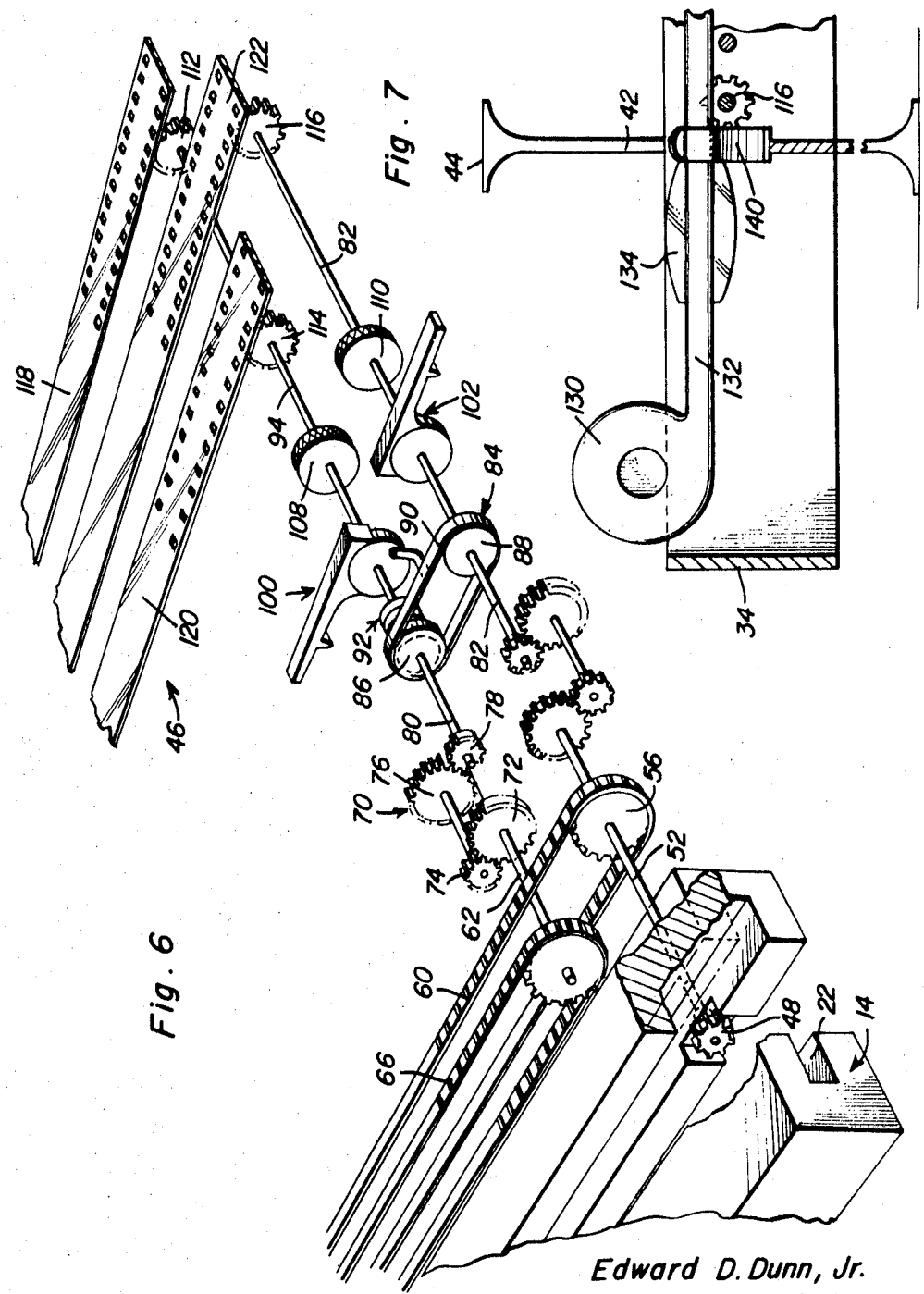

United States Patent Office 3,468,478
Patented Sept. 23, 1969

3,468,478
PRECISION SLIDE RULE COMPUTING MECHANISM
Edward D. Dunn, Jr., 508 Partridge Lane,
Albany, Ga. 31705
Filed Jan. 12, 1968, Ser. No. 697,372
Int. Cl. G06c 27/00
U.S. Cl. 235—71                        13 Claims

ABSTRACT OF THE DISCLOSURE

A conventional type slide rule is rendered more accurate by translating relative movement between the slide and body into proportional movements of flexible tapes substantially longer than the slide and body so as to display expanded scales corresponding to those on the slide and body of the slide rule. The slide and indicator components of the slide rule are drivingly connected through speed increasing gearing to the tapes at an overdrive ratio for this purpose. Each tape is stored in a magazine or container for movement past a readout lens when actuated by the slide, indicator or a manual adjustment knob.

---

This invention relates to a slide rule type of computing mechanism and more particularly to apparatus associated with a conventional type slide rule whereby computations may be effected more precisely.

The slide rule because of its operational simplicity, cost, size and versatility remains one of the most widely utilized computers. However, one of its drawbacks is the relative lack of accuracy capable of being obtained in connection with computations performed thereon. Computational accuracy or precision can only be improved by increasing the length of the slide rule. Unfortunately, any substantial increase in the length of the slide rule renders it cumbersome, more difficult to operate and read. Because of the impracticality in increasing the length of the slide rule, its use as a computer has been restricted to rough computations and making it unsuitable for example for original design work or wherever precision is required.

An important object of the present invention therefore, is to significantly improve the computational precision possible with a conventional type slide rule in a practical manner which does not involve any dimensional elongation of the slide rule.

In accordance with the present invention, a conventional type slide rule is modified by a minimal amount so as to be drivingly connected to a motion translating mechanism through which the movements of the slide and indicator components are multiplied at a high ratio in order to produce corresponding movement of elongated flexible tapes substantially longer than the length of the slide rule displaying expanded scales corresponding to the scales on the slide and body of the slide rule. The flexible tapes are capable of being stored within magazines of small dimension. Furthermore, reading of the scales on the tape may be made easier than the reading of the scales on the slide rule body and slide.

The slide and indicator components of the slide rule are manipulated in the usual fashion by the operator when performing computations. Movements of the slide and indicator components are multiplied at an overdrive ratio through speed increasing gearing transmitted to the scale bearing tapes through a pair of drive shafts. Selectively disengageable clutch means couples one of the drive shafts to the speed increasing gearing so that the tape bearing scales may be moved independently of each other by means of the slide or by knurled adjusting knobs. Brake means are provided to hold one or the other of the drive shafts stationary while adjustments are made. With the clutch engaged, the indicator of the slide rule may be displaced to a reading position causing corresponding movement of the tape bearing scales to readout positions registered through readout lenses or other means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a slide rule computing mechanism constructed in accordance with the present invention.

FIGURE 2 is a top plan view of the computing mechanism with a portion of the housing removed.

FIGURE 3 is a sectional view taken substantially through a plane indicated by section line 3—3 in FIGURE 1.

FIGURE 4 is an enlarged partial sectional view taken substantially through a plane indicated by section line 4—4 in FIGURE 2.

FIGURE 5 is an enlarged partial sectional view taken substantially through a plane indicated by section line 5—5 in FIGURE 2.

FIGURE 6 is an enlarged perspective view showing the operating portions of the computing mechanism.

FIGURE 7 is a partial sectional view showing a portion of the computing mechanism in a reverse position.

FIGURE 8 is an enlarged top sectional view of a portion of the mechanism as shown in FIGURE 2.

Referring now to the drawings in detail and initially to FIGURE 1, it will be observed that the slide rule computing mechanism of the present invention is generally denoted by reference numeral 10. The computing mechanism includes a conventional type of slide rule generally referred to by reference numeral 12 which includes the usual body 14, slide 16 and indicator 18. The slide is provided with laterally extending slide projections 20 received within the grooves 22 of the slide rule body 14 so that the operator may slidably position the slide at positions indicated by the scales on the flush scale surfaces 24 and 26 disposed on either side of the slide and body. The scales on these surfaces may be read by alignment of a hair line 28 embedded in the indicator 18 which is slidably mounted on the slide rule body 14.

The slide rule 12 together with the other components of the computing mechanism, are supported by a housing assembly generally referred to by reference numeral 30. The housing assembly may be of any suitable shape and construction which will vary in shape and design in accordance with manufacturing requirements and other factors. By way of example only, the housing assembly in the illustrated embodiment includes an elongated portion 32 attached to the body 14 of the slide rule, a readout portion 34 spaced from the slide rule body and a connecting portion 36 which mounts the selective controls to be described hereafter. A pair of supporting foot elements 38 are secured to the housing portion 32 and project therefrom transversely across one side of the slide rule adjacent opposite ends thereof. Each supporting element 38 is provided with a pair of support pads 40 spaced from opposite surfaces 26 of the slide rule body so that the mechanism 10 may rest in reverse positions on a supporting surface. A single foot element 42 may be secured to the housing portion 34 centrally between the ends thereof as shown in FIGURE 1 in order to form a third supporting location for the mechanism. The supporting element 42 is also provided with a pair of opposite foot pads 44 spaced from the housing assembly a greater distance than the spacing between the foot pads 40 in order to support the mechanism in an inclined position for easier viewing by the operator.

The housing portion 34 mounts an expanded scale assembly generally referred to by reference numeral 46 which is driven at a constant overdrive ratio to the movement of the slide and indicator components of the slide rule through a motion translating drive arrangement enclosed by housing portions 32 and 36. As shown in FIGURES 2 and 5, a pair of pinion gears 48 are rotatably mounted within the body 14 of the slide rule adjacent opposite ends in meshing engagement with a rack formation 50 formed on one lateral projection 20 of the slide member 16. A similar rack formation 50′ is formed on the other of the formations 20 as shown in FIGURE 5 and on the opposite side of the slide member so that upon withdrawal thereof from the slide rule body, it may be reinstated in a reverse position causing the rack formation 50′ to be enmeshed with the pinions 48. Pinion shafts 52 and 54 are connected to the pinions 48 and project laterally from the slide rule body into the housing portion 32. Sprocket wheels 56 and 58 are secured to the pinion shafts and are drivingly interconnected by an endless sprocket chain 60. It will be apparent therefore, that slidable displacement of the slide member 16 relative to the slide rule body 14 will cause rotation of the pinion shaft 52. By use of a pair of rack engaging pinions 48 drivingly interconnected by the sprocket chain 60, rotation of the shaft 52 in proportion to the movement of the slide 16 is assured at all times when displacing the slide from either longitudinal end of the slide rule body. Also rotatably mounted by the slide rule body in close parallel spaced relation to the pinion shafts 52 and 54, are a pair of sprocket shafts 62 and 64 to which sprocket gears are connected. An endless sprocket chain 66 drivingly interconnects the sprocket shafts 62 and 64 and is connected by the fastener 68 to the indicator 18. It will be apparent therefore, that slidable displacement of the indicator along the slide rule body will produce corresponding rotation of the sprocket shaft 62. The pinion shaft 52 and sprocket shaft 62 project in parallel spaced relation into the housing portion 36 and constitute inputs to a speed increasing drive assembly generally referred to by reference numeral 70.

As shown in FIGURES 2 and 6, the speed increasing drive assembly 70 is formed by a pair of gear trains establishing a pair of power paths from the shafts 52 and 62 to the scale assembly 46 at the same overdrive gear ratio. Each gear train includes a drive gear 72 enmeshed with the pinion gear 74 of a compound gear also having a larger driven gear 76 enmeshed with an output pinion gear 78. The output pinion gears 78 are respectively connected to the drive shafts 80 and 82 that extend toward the scale assembly 46. The shafts 80 and 82 are drivingly interconnected by a speed synchronizing device 84. As more clearly seen in FIGURE 8, the speed synchronizing device includes a pair of pulley wheels 86 and 88 respectively mounted on the shafts 80 and 82. A drive belt 90 is entrained about the pulley wheels so that the shafts 80 and 82 will be driven at the same speed and maintained in the same angular relationship to each other.

A releasable clutch mechanism 92 of any suitable type is associated with the pulley wheel 86 to selectively uncouple the shaft 80 from pulley wheel 86 to disable the synchronizing device 84 for purposes as will be hereafter explained. The drive shaft 82 on the other hand directly transmits drive to the scale assembly in parallel spaced relation to the drive shaft 80. A clutch actuating linkage 96 extends from the clutch mechanism terminating in a displaceable clutch controlling element 98 projecting from the housing portion 36 as shown in FIGURE 1. Accordingly, the operator may selectively disengage the clutch mechanism for rendering the drive connections to the scale assembly 46 independent of each other at the same overdrive ratio. Further, each of the drive shafts 80 and 82 are provided with brake mechanisms 100 and 102 by means of which the operator may hold one of the drive shafts 80 and 82 stationary while the other is being adjusted. Brake actuating controls 104 and 106 operatively connected to the brake mechanisms 100 and 102 respectively, project from the housing portion 36 for manipulation by the operator as illustrated in FIGURE 1. While one of the drive shafts 80 and 82 is held stationary by its associated brake mechanism, the other may be manually rotated for fine adjustment purposes by means of the externally knurled adjustment knobs 108 and 110 respectively connected to the drive shafts 80 and 82, the adjustment knobs projecting from the housing portion 36 for manipulation by the operator. The drive shaft 80 projects into the housing portion 34 and is provided with a pair of axially spaced drive wheels 112 and 114 through which movement is imparted to the scale assembly 46. The drive shaft 82 on the other hand projects into the housing portion 34 and is provided with a drive wheel 116 axially spaced between the drive wheels 112 and 114. The drive wheels 112 and 114 are drivingly engaged with elongated flexible tapes 118 and 120. Any suitable drive engagement may be employed for this purpose whether it be by sprocket wheels and sprocket holes in the tapes as illustrated or by some other drive arrangement. The single drive wheel 116 associated with drive shaft 82 on the other hand is drivingly engaged with the flexible tape 122 disposed in parallel spaced relation between the tapes 118 and 120 as more clearly seen in FIGURE 6.

The elongated flexible tapes are respectively stored and read from three containers or magazines enclosed within the housing portion 34 consisting of the two containers 124 and 126 disposed on either side of the container 128. These containers are similar in construction to each other and are provided with slots through which the drive wheels 112, 114 and 116 project for driving engagement with the tapes enclosed therewithin. The tapes 118 and 120 within the containers 124 and 126 bear scale indicia corresponding to the scales on the surfaces 26 of the slide rule body. The scale indicia on the tape 122 on the other hand corresponds to the scales on the surfaces 24 of the slide member 16. The scale containers 124 and 126 may be permanently mounted within the housing portion 34. The container 128 on the other hand may be removably mounted.

As shown in FIGURES 3, 4 and 7, each of the containers includes cylindrical end portions 130 within which the tape may be stored in a compact condition by being held rolled up by a suitable spring mechanism (not shown). The tape is driven between the cylindrical storing portions of the container through a relatively thin readout portion 132 of the container which mounts on opposite sides thereof, a pair of readout lenses 134 covering opening slots 136 through which the scale indicia on the tape is displayed. As hereinbefore indicated, each of the containers is similar in construction except that the container 128 is provided with two slots 138 disposed on opposite sides of the readout portion 132 of the container and adjacent opposite longitudinal edge portions. Thus, the container 128 may be reversed as seen from a comparison of FIGURES 3 and 7 with the drive wheel 116 projecting into drive engagement with the tape 122 through either side of the container. Furthermore, the container 128 is releasably held within the housing portion 34 by means of the spring retainers 140. The container 128 is reversed whenever the slide 16 of the slide rule is withdrawn and reversed. Accordingly, scale indicia is formed on both sdies of the tape 122 corresponding to the scale indicia on the opposite sides of the slide 16.

From the foregoing description, the construction, operation and use of the slide rule computing mechanism will be apparent. The operator in performing the usual computational operations will displace the slide 16 so that a given scale mark on the surface 24 is aligned with a given scale mark on surface 26 of the slide rule body. Accordingly, selected scale marks on the slide rule body are registered on the scale assembly 46 by movement of the indicator 18 to a position wherein the hair line 28 overlies these scale marks. Corresponding movement will be transmitted at the overdrive ratio aforementioned to the tape 122 within the container 128. The clutch mechanism 92 may then be disengaged through control 98 and the brake 102 engaged. The operator may then accurately adjust the positions of the tapes 118 and 120 through the adjustment knob 108 until the precise desired reading on these tapes is registered through the readout lens associated with the tape containers 124 and 126. When this precisely adjusted reading is established, the drive shaft 80 still uncoupled is locked in position by engagement of the brake mechanism 100 through the brake control 104 and brake 102 disengaged through control 106. The operator may then displace the slide 16 to the desired position aligning a selected scale mark under the hair line 28 of the indicator. The tape 122 is moved to a corresponding position as a result thereof. A finer adjustment of the tape to the desired position as registered through the readout lens 134 may then be obtained through the manual adjustment knob 110. The brake mechanism 100 may then be disengaged and the clutch mechanism 92 re-engaged. The indicator 18 is then moved to a new location in order to complete the usual slide rule computation causing corresponding movement of all of the tapes in order to produce a reading on the expanded scales formed on these tapes.

It will be appreciated therefore, that the computing mechanism may be utilized in a manner as described to effect a computation which may be more accurately performed and readout on the expanded scales on the tapes 118, 120 and 122. The expansion of the slide rule scales will depend upon the overdrive ratio of the speed increasing drive assembly 70 which may be one to ten for example. By providing a selectively disengageable clutch 92, the slide scale tape 122 may be moved separately from the body scale tapes 118 and 120 in order to precisely register the scale mark values on the body and slide of the slide rule underlying the hair line of the indicator. The indicator may then be moved to another position in order to perform a particular computation. The solution readout of said computation will then be more accurately and readily registered through the scale assembly 46 as described.

The foregoing is considered as illustrative only of the principles of the invention, numerous modifications and changes will readily occur to those skilled in the art, without departing from the spirit of the invention.

What is claimed as new is as follows:

1. In combination with a slide rule having a body, a slide member and an indicator member, a mechanism for improving the computational precision of the slide rule comprising movable scale means substantially longer than the slide member, means for storing said scale means in operative relation to the body of the slide rule, position translating means drivingly connecting the slide member and the indicator member to the scale means for proportional movement thereof at an overdrive ratio, and readout means for indicating the positions of the scale means corresponding to the relative positions of the slide and body.

2. The combination of claim 1 including computational adjusting means operatively connected to the position translating means for selectively moving the scale means independently of each other.

3. The combination of claim 2 wherein said scale means includes a plurality of elongated flexible tapes driven by the position translating means at said overdrive ratio.

4. The combination of claim 3 wherein said storing means comprises a plurality of containers mounted in fixed spaced relation to the slide rule body, said containers having storage compartments enclosing the flexible tapes and readout portions through which movement of the tapes are guided, at least one of the containers being reversibly mounted for position readout of one of the tapes on both sides thereof through the readout means.

5. The combination of claim 4 wherein said position translating means comprises first gear means rotatably mounted by the body adjacent opposite ends thereof in driving engagement with the slide member, second gear means mounted by the body and drivingly connected to the indicator member, a pair of drive shafts, speed increasing drive means respectively transmitting motion from said first and second gear means to the drive shafts at said overdrive ratio, and synchronizing means interconnecting the drive shafts for simultaneous rotation in a predetermined angular relation to each other, one of said drive shafts being drivingly engaged with at least one of said flexible tapes of the scale means and the other of the drive shafts being drivingly engaged with at least two of the other of the flexible tapes.

6. The combination of claim 5 wherein said computational adjusting means comprises manual means connected to the drive shafts for selected movement of the scale means, selectively disengageable clutch means for uncoupling one of the drive shafts from the synchronizing means and brake means engageable with the drive shafts for selectively holding one of the drive shafts stationary while the other is selectively moved to change said predetermined angular relationship of the drive shafts.

7. The combination of claim 1 wherein said position translating means comprises first gear means rotatably mounted by the body adjacent opposite ends thereof in driving engagement with the slide member, second gear means mounted by the body and drivingly connected to the indicator member, a pair of drive shafts, speed increasing drive means respectively transmitting motion from said first and second gear means to the drive shafts at said overdrive ratio, and synchronizing means interconnecting the drive shafts for simultaneous rotation in a predetermined angular relation to each other.

8. The combination of claim 7 including computational adjusting means operatively connected to the position translating means for selectively moving the scale means independently of each other.

9. The combination of claim 8 wherein said computational adjusting means comprises manual means connected to the drive shafts for selected movement of the scale means, selectively disengageable clutch means for uncoupling one of the drive shafts from the synchronizing means and brake means engageable with the drive shafts for selectively holding one of the drive shafts stationary while the other is selectively moved to change said predetermined angular relationship of the drive shafts.

10. The combination of claim 1 wherein said scale means includes a plurality of elongated flexible tapes driven by the position translating means at said overdrive ratio.

11. The combination of claim 10 wherein said storing means comprises a plurality of containers mounted in fixed spaced relation to the slide rule body, said containers having storage compartments enclosing the flexible tapes and readout portions through which movement of the tapes are guided, at least one of the containers being reversibly mounted for position readout of one of the tapes on both sides thereof through the readout means.

12. The combination of claim 11 wherein said position translating means comprises first gear means rotatably mounted by the body adjacent opposite ends thereof in driving engagement with the slide member, second gear means mounted by the body and drivingly connected to the indicator member, a pair of drive shafts, speed increasing drive means respectively transmitting motion from said first and second gear means to the drive shafts at said overdrive ratio, and synchronizing means interconnecting the drive shafts for simultaneous rotation in a predetermined angular relation to each other, one of said drive shafts being drivingly engaged with at least one of said flexible tapes of the scale means and the other of the drive shafts being drivingly engaged with at least two of the other of the flexible tapes.

13. The combination of claim 1 wherein said storing means comprises a plurality of containers mounted in fixed spaced relation to the slide rule body, said container having storage compartments enclosing the scale means and readout portions through which movement of the scale means are guided, at least one of the containers being reversibly mounted for position readout of the scale means on both sides thereof through the readout means.

References Cited

UNITED STATES PATENTS

| | | | |
|---|---|---|---|
| 2,439,025 | 4/1948 | Sammons | 235—71 |
| 2,451,784 | 10/1948 | Tellander | 235—71 |
| 2,527,776 | 10/1950 | Taafe | 235—71 |
| 2,530,191 | 11/1950 | Clouez | 235—71 |
| 2,826,361 | 3/1958 | Saliba | 235—71 |

STEPHEN J. TOMSKY, Primary Examiner

STANLEY A. WAL, Assistant Examiner

U.S. Cl. X.R.

235—70